April 7, 1970   J A. KOLIBAS ET AL   3,504,973
COPYBOARD
Filed July 7, 1967   8 Sheets-Sheet 6

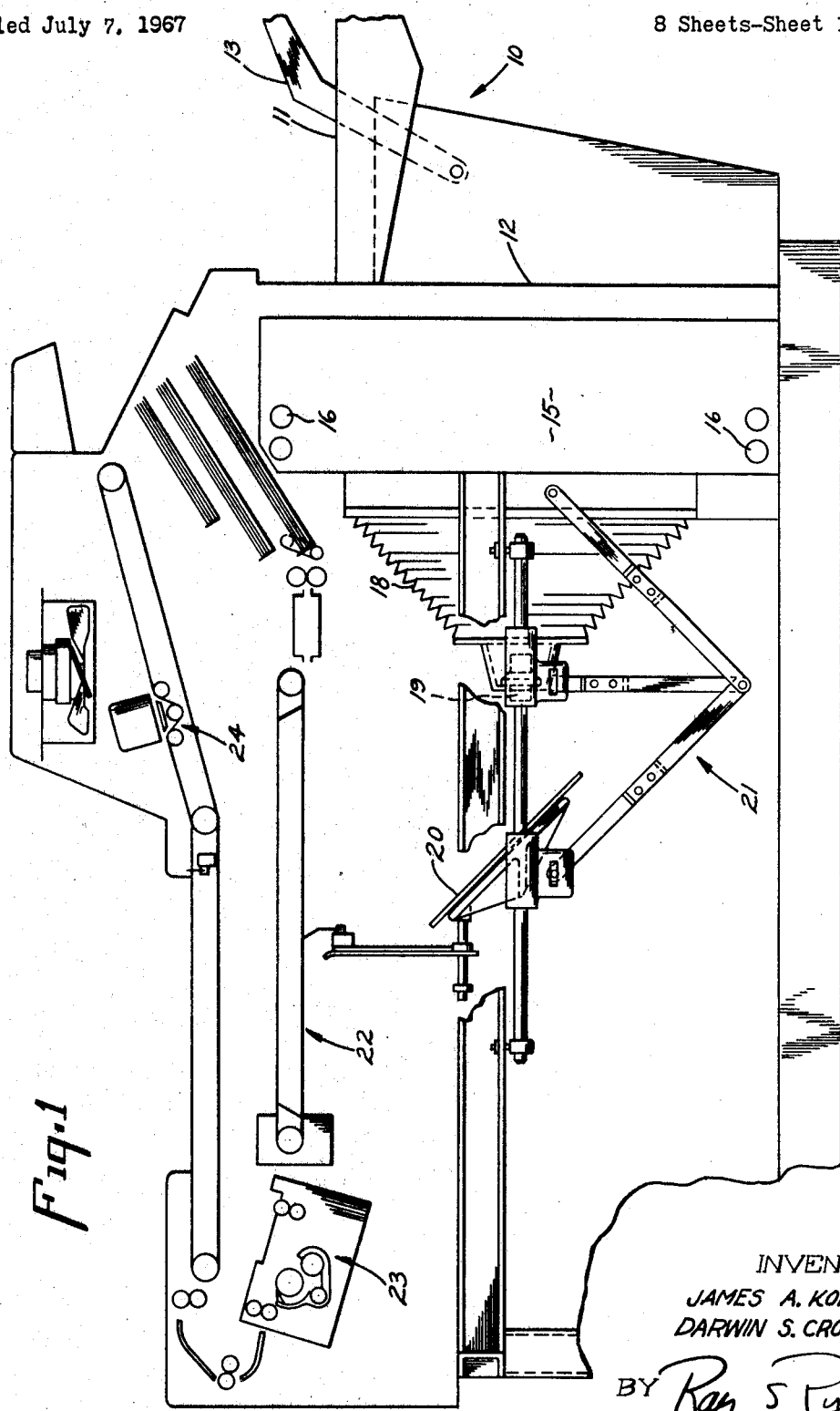

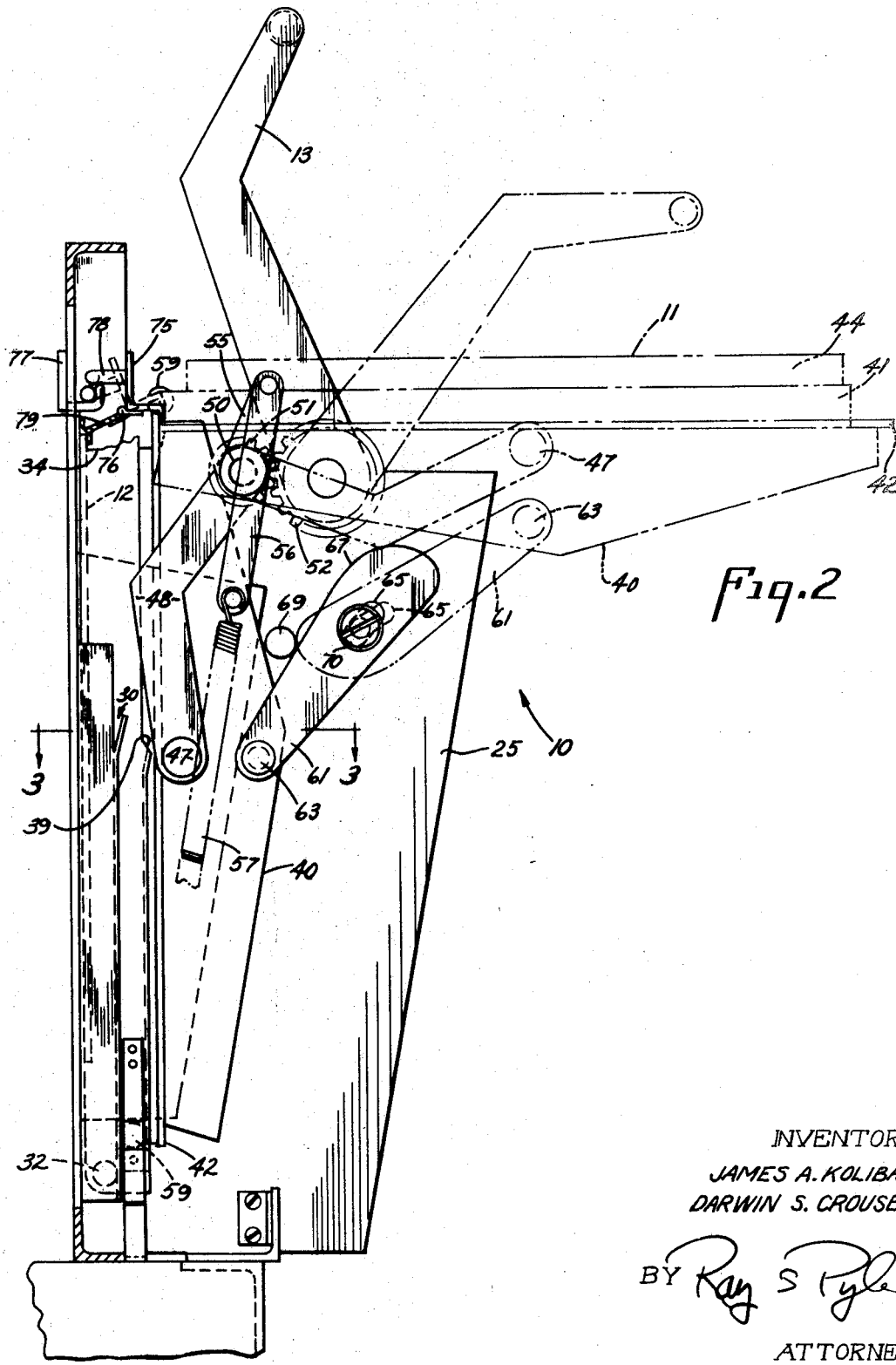

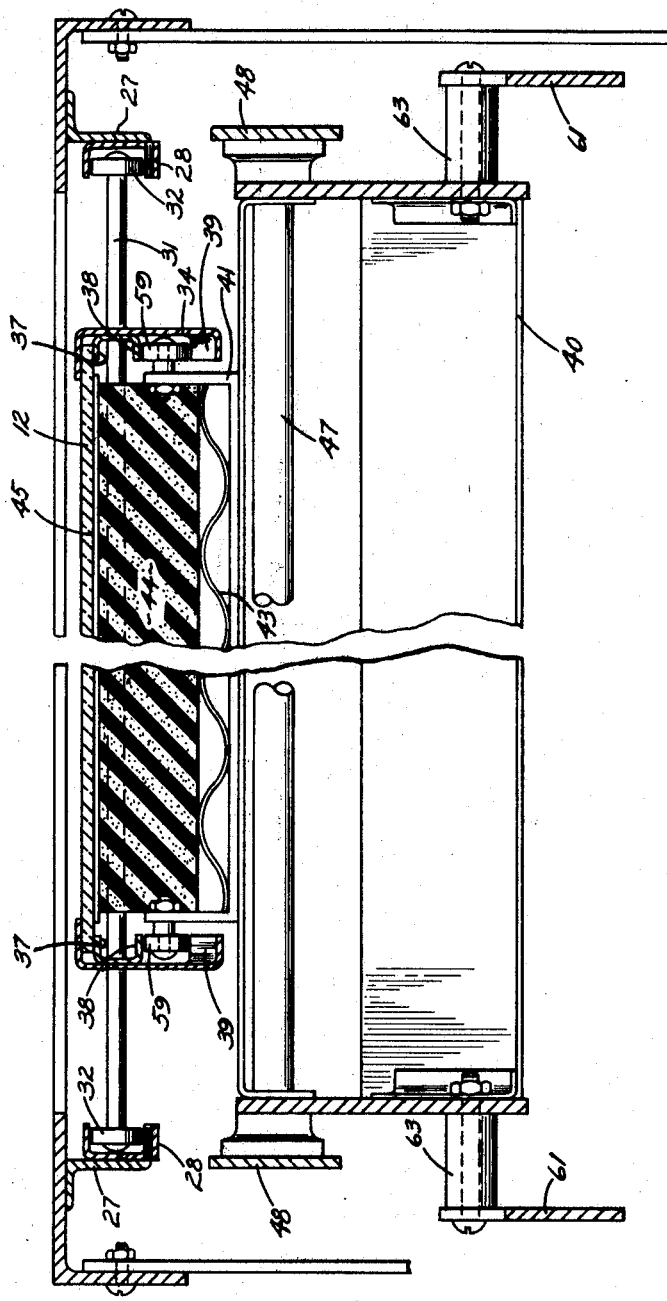

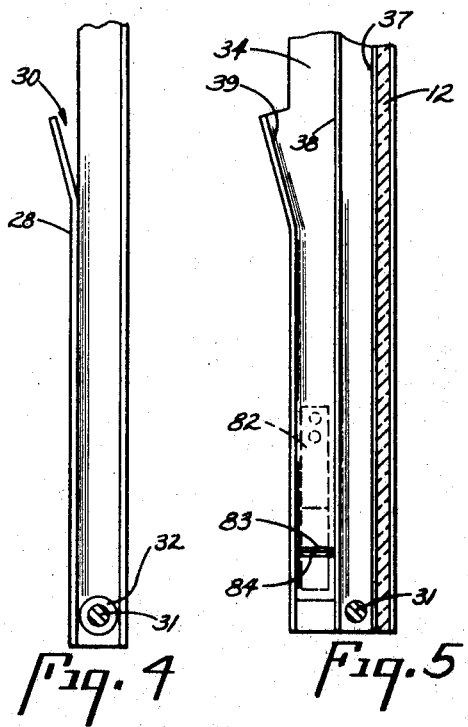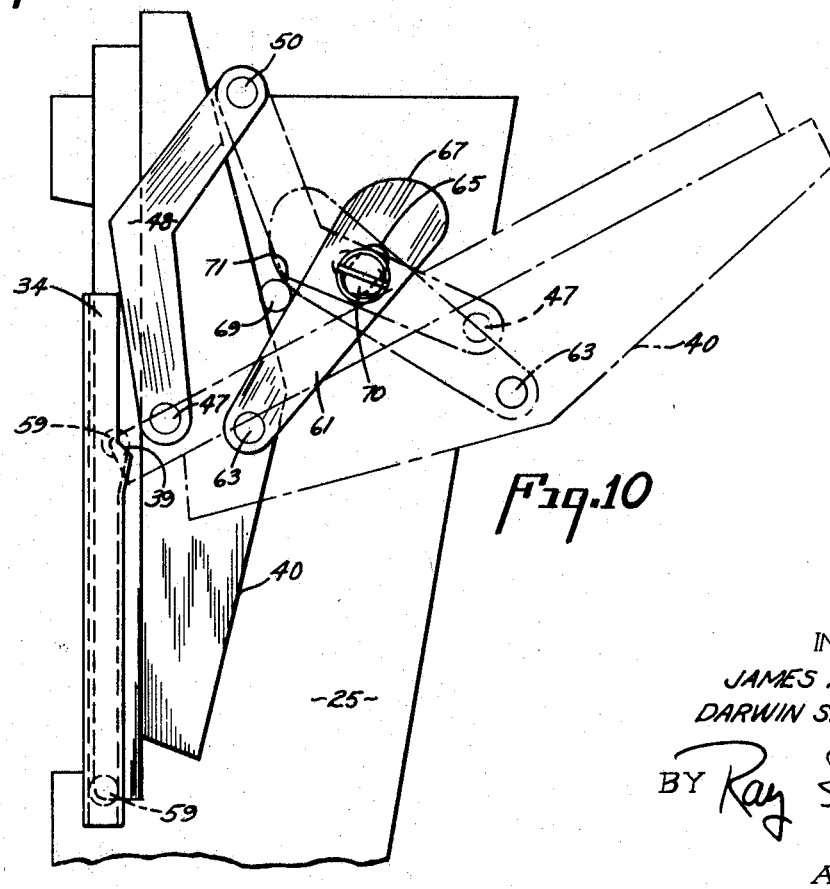

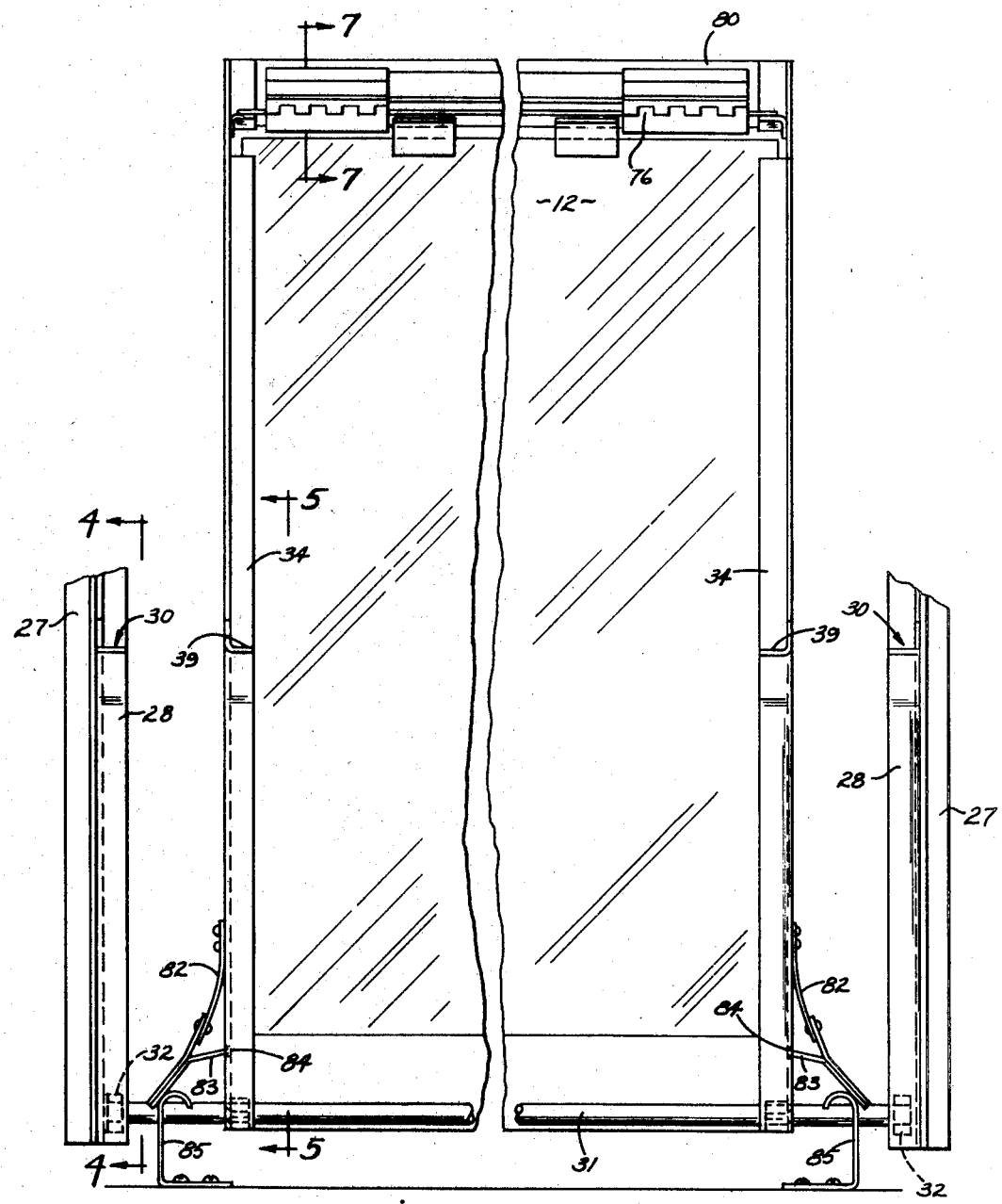

INVENTORS.
JAMES A. KOLIBAS
DARWIN S. CROUSER

BY Ray S Ryla

ATTORNEY

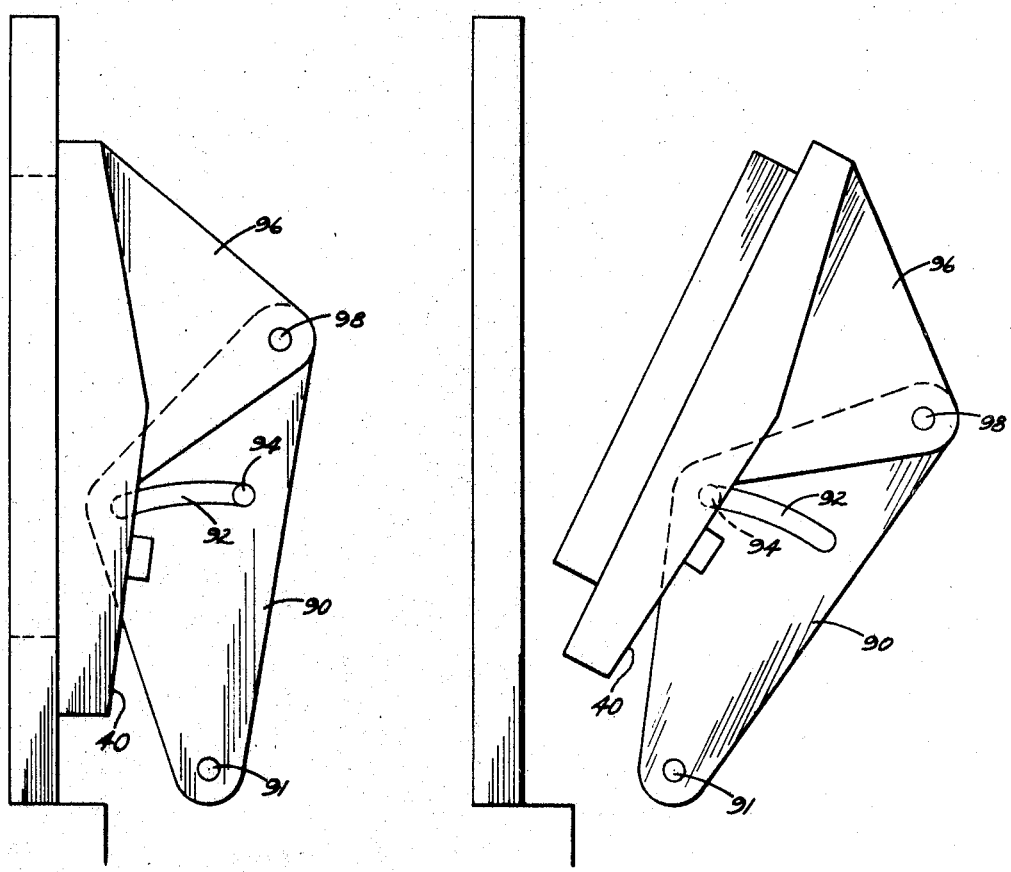

April 7, 1970   J. A. KOLIBAS ET AL   3,504,973
COPYBOARD

Filed July 7, 1967   8 Sheets-Sheet 8

INVENTORS.
JAMES A. KOLIBAS
DARWIN S. CROUSER

BY Ray S Pyle

ATTORNEY

3,504,973
COPYBOARD
James A. Kolibas, Brookpark, and Darwin S. Crouser, North Canton, Ohio, assignor to Addressograph Multigraph Corporation, Cleveland, Ohio
Filed July 7, 1967, Ser. No. 651,733
Int. Cl. G03b 27/62, 27/64
U.S. Cl. 355—75                                    4 Claims

ABSTRACT OF THE DISCLOSURE

In an environment of a process camera having a vertical reference plane beginning substantially at floor level, a copyboard is shown and described in two preferred embodiments. The first embodiment uses a track system though part of the copboard movement and supplies a compound linkage through the other part, for confinement of copyboard movement within allowable space limitations. The second embodiment provides a simplified overcenter linkage system and enables copyboard tilting to a sitdown composition position similar to a draftsman's drawing board.

CROSS REFERENCE TO RELATED APPLICATION

Application Ser. No. 627,757, filed Apr. 3, 1967, relates to the process camera improvement generally which is a device for which this copyboard is useful.

BACKGROUND OF THE INVENTION

The terms "copyboard" and "process camera" are widely used in the art and will be used throughout this specification and the claims. In the use of process cameras, as a prime example, work which is to be photographically viewed and projected to an image plane for any reason, is placed upon a table surface, which surface is the top of a copyboard. In many devices the copyboard is a fixed table, but often the copyboards are an arrangement to accept paper at a convenient table height position and transport it to a plane which is the object plane of a focusing lens system. Such copyboard devices are of a great variety in nature but often comprise some sort of a hinged device which will close a glass plate upon work held on a table surface, and then pivot the table and glass plate around a hinge structure from a table attitude to the position of the object plane.

A companion application entitled Electrostatic Imaging, filed Apr. 3, 1967, Ser. No. 627,757, illustrates a process camera which employs a lens system having the focal axis low with respect to the supporting base in order that a fixed distance portion of a variable dimension in a Peaucellier autofocusing device may be employed in a unique manner to project the image upwardly to a conveyor transport. In addition to the novelty of operation and result set forth in that companion application, the benefit of such arrangement is a far more compact structure in an environment which normally tends to get overly large.

However, such a device requires the object plane to which the original material to be copied, sometimes referred to as "hard copy" must be transported to be at a level which is normally a stooping position for an operator. Hence, it will not be satisfatcory to require the operator to work at substantially floor level and pivot the table and glass sandwich structure upwardly to image position. Other known devices appear to be equally difficult to employ.

Accordingly, it is the intention of this invention to provide a copy holding surface which will shuttle between a vertical object plane, and a table top attitude. The table top attitude position is about normal in height for most operators to work in a comfortable manner.

Masters for lithographic production of multiple copies are commonly produced from reserved source copy. Whenever a new printing is required, the reserve set is used to produce a set of masters, and the masters used to print a quantity. To use this invention efficiently for such master production, a guide is secured in position to rest at the surface of the copyboard in the elevated position. The nature of the copyboard, which carries the copy to a glass reference plane, will not permit the use of a bulky guide that moves with the copyboard. The guide is a fixed position device, and therefore, the copyboard must move up to the guide position, but it cannot go above the guide position, because the guide interferes. These two conflicting factors are harmonized by this invention.

The reserved set is placed on the copyboard, one at a time, as directed by the guide without the need for operator concentration. No time is required to observe guide lines and shift the set to the lines. The copyboard and process camera then operate with maximum efficiency.

However, by placing permanently positioned auxiliary location devices at the level of the top surface of the copyboard in table attitude requires the board to drop downwardly from its ultimate top plane and then tilt forwardly to the vertical plane without any portion of the copyboard rising above its top limits. A copyboard supported by ordinary pivots will not accomplish this result, but would cause the board to strike the locating devices.

Furthermore, the return movement to the starting position must be easy to accomplish with minimum power, in order that it may be done by hand operation if desired, also avoiding any intrusion above the top level limitation.

Additionally, with a glass plate as the vertical object plane in position before the camera, the copy table may not, at any time, project beyond the plane of the glass wall thus provided. Hence, the working environment for a copyboard to meet these requirements is quite limited, and no known conventional pivot system is available to provide a movement of this nature.

This invention has solved this difficult problem by the compound system employing a cooperating set of differing guide systems, one of which takes up where the other leaves off in order to produce the desired and necessary movement. Further, the invention provides for transporting the glass wall with the table whenever it is desired to clamp bulky objects in a more conventional manner.

SUMMARY OF THE DISCOVERY

The advantage of the discovery which constitutes this invention, is that a copyboard, unencumbered by a clamping device such as glass plates, may work solely within the fourth quarter quadrant with reference to an X–Y coordinate scale. The copyboard top surface will travel from the X axis to the Y axis and in this manner permit a process camera to be placed at a lower level than would otherwise be comfortable and convenient for operator access. Usually process cameras provide the copyboard in a compromise location resulting in a huge machine or inconvenient operator access, or both.

The unobvious novelty over the prior art developed out of an effort to study methods for holding paper to a copyboard surface in order to avoid the displacement of that paper by windage and similar problems inherent in closing a hold-down cover device.

Because paper of various thicknesses lie at differing planar levels, and hold with various degrees of flatness to the copyboard surface, a glass plate is employed as a reference plane, and the paper which is composed on the copyboard is brought to the rear surface of the glass plate. By this means, a precision location for extraordinary exactness of focus is assured.

In the use of the copyboard without the cover of conventional prior art devices, the lack of operator fatigue in production was noticed and soon became very apparent. The fatigue factor in conventional devices has never been considered in prior practice, because most prior devices are used only in an artisan environment. The present discovery is most effective in high production work.

Having made the twin discoveries of perfect leveling of all hard copy to an established focus reference plane, and removal of the operator fatigue factor, it becomes an object of this invention to provide a glass plate, but to park that plate and use it as a reference plane wherein the material to be copied is brought to the glass and compressed against the glass at the lens focal point rather than having the glass travel with the copyboard. Nevertheless, it is the object of this invention to provide for the optional over-riding of this provision and to enable the operator to operate the glass with the copyboard as a unitary structure.

DESCRIPTION OF THE DRAWINGS

Other objects and a fuller understanding of this invention will be observed as the description of the preferred embodiment proceeds in conjunction with the drawings illustrating the invention in which:

FIGURE 1 is a schematic illustration of a production machine with copyboard apparatus embodying the principles of the invention;

FIGURE 2 is a side elevation to a larger scale of the copyboard apparatus shown in FIGURE 1, but with the left side housing removed to reveal the interior;

FIGURE 3 is a section to a larger scale, taken along the line 3—3 of FIGURE 2;

FIGURE 4 is an inside elevation detail taken along line 4—4 of FIGURE 6;

FIGURE 5 is an elevation detail taken along line 5—5 of FIGURE 6;

FIGURE 6 is a front elevation, to a scale enlarged with respect to FIGURE 2, of the vertical glass reference plane and its track frame with the copyboard and its supporting apparatus removed;

FIGURE 7 is a detail of latch mechanism taken along line 7—7 of FIGURE 6;

FIGURE 10 is a schematic illustration of the copyboard at an intermediate position wherein the guide track and the linkage mechanism transfer guiding and support functions;

FIGURE 11 is a schematic illustration of an alternative embodiment in its lower position;

FIGURE 12 is the alternative embodiment in the first stage of movement away from the lower position;

DESCRIPTION OF THE PREFERRED EMBODIMENT

Figure 8:
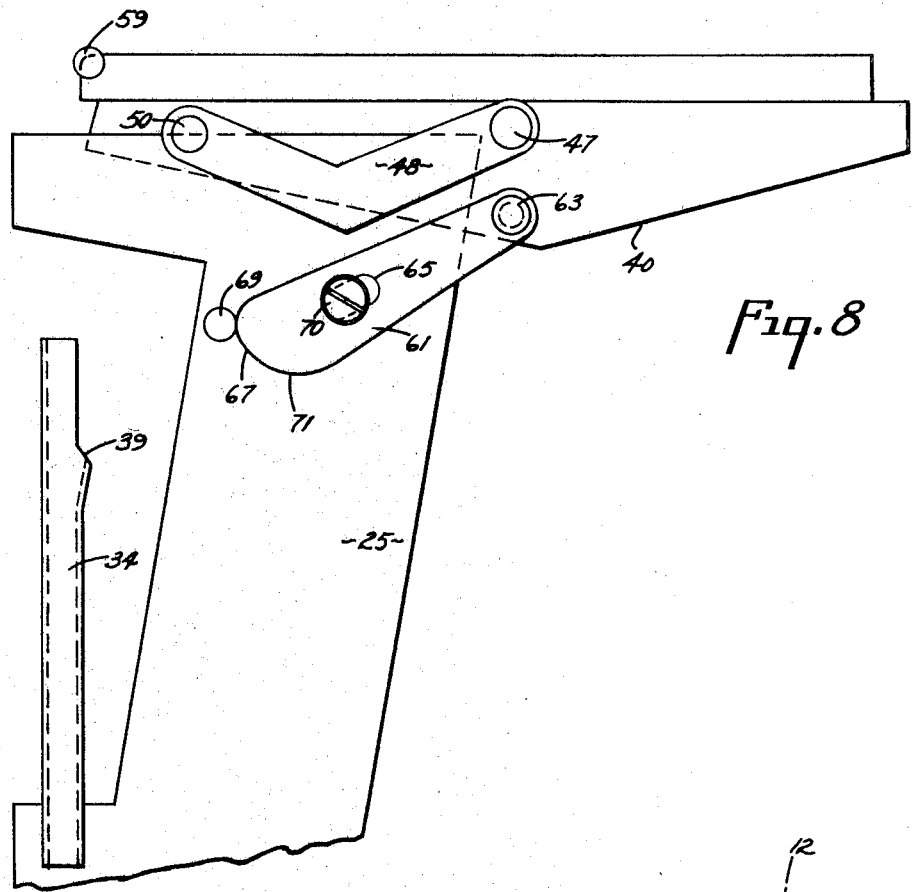
FIGURE 8 is a schematic illustration of the copyboard in the elevated position, with only the supporting links illustrated, and all other mechanism eliminated for clarity.

FIGURE 1 illustrates in general, a process camera with which this invention is useful. FIGURE 2 is an enlarged view of a copyboard 10 and its associated pivot support structure, shown as part of the process camera in FIGURE 1.

The copyboard 10, which may be referred to generally as a composition shuttle, particularly in its full structural embodiment, is provided for the purpose of accepting original material to be copied. It is termed a composition shuttle. It has a first position which is table-like and second position at a lower vertical camera range. Thereby, the material may be arranged in proper relationship on the table, and shuttled to camera range for the desired image to be made upon a resultant photosensitive sheet. On occasion, several pieces of material will be grouped together and thereby "composed" to set up a resultant image for the final exposure to be made upon a master.

The illustrated apparatus, and the technical principles set forth hereafter, are applicable to any photosensitive sheet. One outstanding use for the apparatus is the rapid and superior production masters for lithographic use. Therefore, the term "master" is used herein as a specific example of a photosensitive sheet.

The composition shuttle copyboard has a support surface 11 upon which original material is placed and composed or related in order to be prepared for presentation to the camera. This position is in phantom outline in FIGURE 2. The shuttle is supported by mechanism for causing the shuttle to move to a second position as shown in full line in FIGURE 2. In the second position, the material is placed against a plane 12. The preferred embodiment incorporates a transparent plate glass reference support as plane 12. Hereafter the plate glass and the reference plane will be used interchangeably throughout this description. The shuttle carries the original material downwardly and forwardly from its uppermost position shown in dotted outline in FIGURE 2, to the vertical contact position of the plane 12. A manual handle 13 is shown as the means to drive the mechanism for causing the shuttle 10 to move between the table position and the vertical contact position.

Refer to FIGURE 1. On the opposite side of the plane 12 from the contact position, is a lamp house 15 in which a plurality of lamps 16 are placed to illuminate the subject matter held between the support plane 12 and the surface 11 of the shuttle 10.

A bellows 18 with a lens 19 permits only the light of a projected image to emerge. In order to reduce the total bulk of equipment for projecting and processing, the copyboard places the object on plane 12 below the composition table height. The optical axis of lens 19 is, therefore, caused to be at a lower level. Then, a mirror 20 is used to revert the image, and to project the image upwardly so that processing equipment may be stacked over the lens system without creating an unduly long or high structure.

A three-link Peaucellier linkage indicated generally by the reference character 21, is an autofocus structure and is employed to project an image through the lens 19, reverting it by means of the mirror 20, and projecting the image onto a transport device indicated by the general reference character 22. The transport device 22 is an arrangement whereby photosensitive material is brought into proper position with respect to an image reflected by the mirror 20, and after exposure, carries the material through a toning station 23 and a fusing station 24, whereafter the completed photosensitive sheet, whether it is a master or other designated sheet, is delivered in a useful condition.

This particular process camera is illustrated here as taken from the companion application referenced above. It is an illustration of one use for this copyboard invention.

Particular attention is directed to the composition shuttle 10 shown throughout the balance of the drawings. The copyboard is at a convenient height in order that an operator may stand at the board to place original material thereon with ease. The operator stands at a position at the front of the body and a work surface extends away from the operator to the opposite side. It is this work surface area which holds the material arranged by the operator.

There is no apparatus shown in FIGURE 2 above the surface of the copyboard, although it is intended that guide devices be attached to the frame of the machine and held at the work surface level in order to assist the rapid placement of a series of original material sheets for copying, as one example. This use is set forth in more detail above under the "Background" heading. Furthermore, the vertical object reference plane is a glass plate. Therefore, the edge remote from the operator cannot go beyond the glass reference plane, and the top surface may never swing above the plane in which it is illustrated in FIGURE 2, wherein it is positioned to receive the original copy. The board moves up to that plane, and then swings downwardly and forwardly, never passing the glass reference plane and never permitting any portion of the table top to project above the working top surface.

In FIGURE 2 of the drawing, the copyboard is shown in its lower position ready for copy exposure, and a phantom outline of the table is shown in the upper work receiving position. In order to permit full line drawings for clarity, the portion of the structure which may be considered the left hand side of the machine, comprising a support frame and decorative cover, has been removed in FIGURE 2. The opposite right hand side, which is identical, is indicated by the reference 25, and remains in the FIGURE 2.

This invention provides for travel of the copyboard without the glass cover, or at the operator's option, the use of a glass cover for holding work in position. Means which are not a portion of this particular invention are employed to hold paper or similar sheet material on the surface of the copyboard without a covering glass plate as used in most instances.

COPYBOARD WITHOUT GLASS

In order to see and understand the physical structure provided, refer to the FIGURE 6, in conjunction with FIGURE 3. In FIGURE 6, the operating copyboard structure 10 has been removed in order to show the structure of the reference plane. Two laterally spaced vertical posts 27 carry wheel guide tracks 28. The tracks are trough shaped for roller wheel retention. Each has an entrance opening 30 which may be seen better in FIGURE 2. An axle 31 bridges between the tracks 28. Roller wheels 32 operate in the tracks and carry the axle 31 between a lowermost position as shown in FIGURE 6, and the entrance opening 30.

Frame members 34, laterally disposed within the bounds of the tracks 28, have a U cross sectional configuration. The frame members 34 are mounted on the axle 31. The glass plate 12 serves as the vertical object reference plane, and is secured to the frame members 34 by means of clamping action of channels 37 mounted in the frame members. The mounting and locking by the cooperating channels is seen best in FIGURE 3. The glass plate reference plane 12, and its supporting frames are able to sit in a vertical parked position, or may be elevated by rolling the wheels 32 up and out the openings 30 for separation from the tracks 28.

The channels 37 each have a forward wall 38 which cooperates with the side of the frame 34 in which it is mounted, to create another pair of wheel guide tracks. The tracks provided by the channels 37 within channel frames 34 are employed to guide movement of the copyboard. The side wall of each frame member 34 is formed with an opening 39, opening into the wheel guide tracks. The section view FIGURE 3 is taken directly above the openings 39, and the forward sloping wall of the openings 39 may be seen in the FIGURE 3.

Refer to FIGURES 2 and 3. The copyboard is built upon a bed frame 40 which is substantially an angular flat plate in the illustrated embodiment. Above this frame is a top box frame 41, with planar flange rim 42. Within the top frame 41 is a spring cushion 43 (FIGURE 3) which underlies a resilient pad 44. Finally a table surface sheet 45 overlays the pad 44 as the actual table top surface.

The copyboard is carried by two centrally located pivots. A shaft 47 serves as one such pivot. Shaft 47 extends laterally across the copyboard about at the peak area of the bed frame 40. Two links 48 provide the main transport motivation for the copyboard. The links are connected at their first ends on opposite sides of the shaft 47. Each of the side housing frame members 25 carries a stub shaft pivot 50 (see FIGURE 2) and the second end of the links 48 are carried on the shaft pivots 50. A pinion gear 51 mounted on the shaft pivot 50 is adapted to receive motivation drive force from a drive gear 52. The manual drive handle 13 is indicated as the primary power source to actuate gear 52 and the links 48, although power devices may be substituted. The particular shape of the links 48 is significant only that they are designed to clear associated equipment without interference.

In order to avoid placing the entire weight of the copyboard upon the primary drive source, being handle 13 in the illustration, a counterbalance system is provided to take some of the weight. Half of this counterbalance system is illustrated in FIGURE 2, the companion side having been eliminated in FIGURE 2 for clarity of illustration. This system includes links 55 carried by the shaft pivots 50 and connecting links 56 which carry a tension spring 57. The arrangement of the spring operating through the links is such that it is an overcenter device which assists in holding the copyboard against the glass plate reference plane 12 in the full line position shown in FIGURE 2, but goes overcenter to assist in elevating the copyboard upon actuation of the drive handle 13.

The second end of the copyboard, that end removed from the operator position, is equipped with a pair of roller wheels 59 which operate within the channel of the U-shaped frame member 34, as best shown in FIGURE 3. Therefore, from the full line position shown in FIGURE 2, as the handle 13 is operated to rotate the link 48, the table pivots outwardly around wheels 59 and begins to elevate, guided by the coaction between the fixed arcuate path in which the shaft 47 is driven, and the confinement of the roller wheel 59 to a vertical path within the tracks of the frames 34. This situation will prevail until the roller wheels 59 reach entrance openings 39, whereupon the roller wheels are freed from further confinement within the track of frame 34. The copyboard 10 would be free to swing freely about shaft 47 at this time but for the transfer of control to another linkage system.

In order to guide the elevation of the board from the moment of separation of the roller wheels 59, a pair of second links 61 are employed to cooperate with the links 48. Pivot pins 63 which are part of the general mounting means, project from opposite sides of the copyboard shuttle. Pins 63 are located directly below the shaft 47 in FIGURE 2, and carry the links 61.

For ease of description, only one of the links 61 will be referred to in the singular, and the description will best be followed by reference to FIGURES 2 and 10. Link 61 is slotted longitudinally and the slot is referred to by the reference character 65. The end of the link is curved in a compound configuration end 67. An abutment surface pin 69 carried by the side housing frame 25 serves as a fixed reference for the link. The pin 69 and the configuration end 67 act as a cam and cam follower. A pin 70 also carried by frame 25, projects through the slot 65 and serves as a guide pivot upon which link 61 may shift, in conjunction with the operation of the end 67 against the pin surface 69.

In FIGURE 10, the roller wheels 59 are shown at the entrance opening 39. This position may be considered either as ascent or descent of the copyboard 10. Considering the motion as ascending, it may be seen that a point 71 on the compound configuration end 67 is in contact with the pin 69, and that the curvature of the end 67 is formed such that further upward swinging movement of the copyboard by drive motion applied to the shaft 47, causes the pin 63 to elevate, and will hold the link 61 between the abutment pin 69 and the pivot pin 63. The link 61 will be confined to an arcuate path because of the pin 70 confining the longitudinal slot 65. Hence, the link 61 can move only in the path which will maintain a prescribed distance between pin 69 and the slot 65, and this distance is calculated and formed to cause an upwardly arcuate movement of the pin 63.

As the shaft 47 is elevated around its arcuate path, causing the pin 63 to move upwardly in an arcuate path also, the link 61 continues to pivot the compound end 67 along the pin 69 until ultimately the position shown in FIGURE 2 in dotted outline is reached. Because of the configuration of end 67, the path of the pins 63 is a shorter radius than the path of shaft 47, causing the second end of the copyboard carrying the wheels 59 to be rotated rapidly to the level position of the dotted outline shown in FIGURE 2. Also, the distance between the pins 69 and 70, and the formation of the longitudinal slot 65 causes a locking action which holds the copyboard in the upper position shown in FIGURE 2. Nevertheless, the board may be caused to descend with slight force applied to the board. Because it can be upset with such slight driving force, it is desirable that the handle 13 actually be locked in order that lifting motion by the operator on the remote end of the board will not cause an inadvertent descent.

COPYBOARD WITH GLASS

It is intended that the material to be copied be held on the surface sheet 45 without an exterior clamp or cover as normally employed. Nevertheless, it is necessary at times to place objects on the copyboard of such bulk or weight that the normal procedure will not suffice to hold the object or objects properly related upon the board. This invention provides for the option by the operator to combine the glass plate reference plane 12 with the copyboard 10 for this purpose.

Refer to FIGURE 2. The copyboard in its lowered position, as shown in full line drawing, presents the planar rim 42 extending vertically with respect to the glass reference plane 12. A clamp 75, which is shown in more detail in the FIGURE 7, is carried on a pivot rod center 76. The pivot rod center is a hinge which bridges between the two lateral side frames 34 as shown best in FIGURE 6. In FIGURE 2 the side frames 34 have been broken away in order to avoid using dotted outline drawings to illustrate the structure. Hence, the hinge or pivot rod center 76 is shown in end view in FIGURE 2.

A hook 77 is mounted upon the permanent frame of the lamp house 15 and serves as an anchor for the top of the glass plate 12 and its mobile framework. The clamp 75 is part of the mobile framework and is secured across the top of the glass plate.

The clamp 75 has a loop catch 78 extending rearwardly and engageable upon the hook 77. The engagement situation is shown in dotted outline in FIGURE 2, and is the full line position illustrated in FIGURE 7. A brace 79 and a header 80 extend between the frame members 34. Brace 79 has one leg welded to header 80 and a second leg which acts as a clip holding the top of the glass plate 12. The brace extends outwardly and forms a support for the pivot rod center 76. Structurally, the rod center 76 is a hinge having a central pivot rod and two wings, one of which is secured to the brace 79 and the other is secured to carry the clamp 75. This structure is illustrated best in FIGURE 7.

The clamp 75 serves to unite the glass and its frame to the copyboard structure only when this is desired by the operator. Normally, the clamp 75 remains in the FIGURE 7 position wherein it holds the glass tightly positioned to the structural frame by attachment to hook 77. When the operator desires to use the glass as a physical clamping device for books and the like, the clamp 75 is pivoted about the center 76 to the position shown in full lines in FIGURE 2. The glass is released at the top from the permanent framework hook 77 and secured to the rim 42. Then, whenever the copyboard is actuated to the elevation position shown in dotted outline in FIGURE 2, the frame members 34 are caused to pivot outwardly and rise with the copyboard.

Whenever the glass is caused to move along with the copyboard, then the roller wheels 59 remain in a fixed position in the track defined by the members 34 and 38. The guiding support for both members is then performed by the roller wheels 32 acting in the tracks 28.

Figure 9:
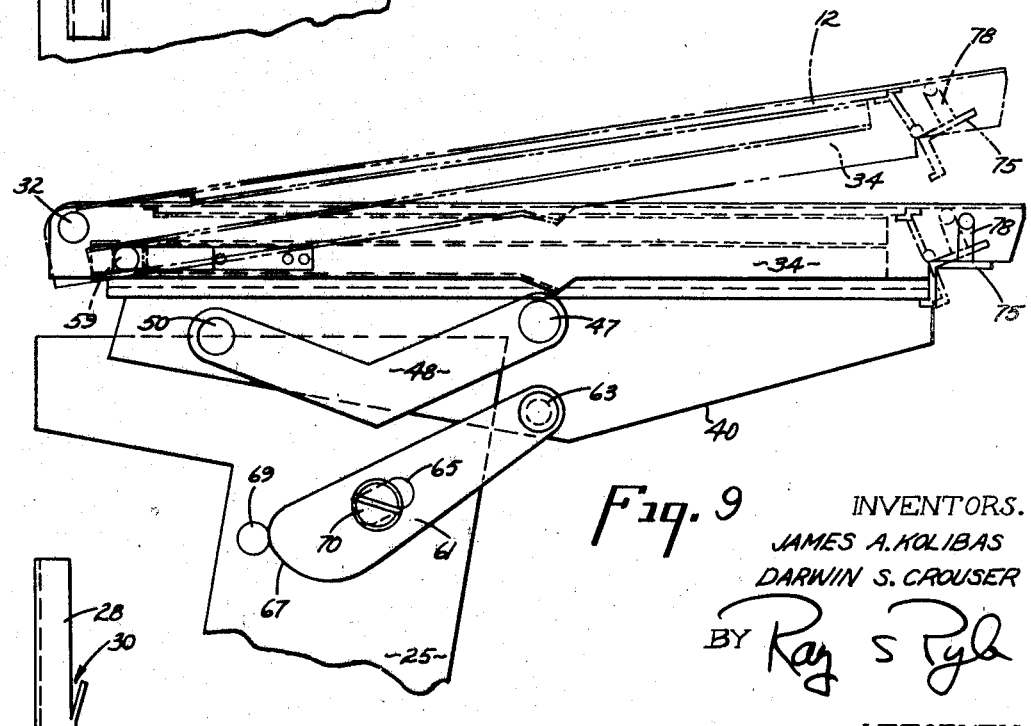
FIGURE 9 is a schematic illustration of the copyboard and glass, in the elevated position with the glass pivoted to an open position.

Refer to FIGURE 9. After the glass 12 has been elevated with the copyboard, it is necessary to pivot the glass with respect to the table surface sheet 45 in order to make use of its holding function. Normally the copyboard pivots upon the wheels 59 within the track of the frame 34, but upon elevation to the FIGURE 9 position, the function is reversed and the glass and its framework is pivoted about the wheels 59 as a rotational center. In order to assure the permanent location of the wheels 59 in the proper pivot location, a device has been added which causes the wheels 59 to be trapped at the bottom of their tracks upon elevation of the glass in its frame. Refer to FIGURE 6. Spring arms 82 carried on the side of the frames 34 each has a projecting trap arm 83 which is aligned to a lateral opening 84 in the associated frame 34. A pair of deflectors 85 carried in a permanent location on the frame of the machine acts to deflect the spring arms 82 outwardly and withdraw the trap arms 83 as shown in FIGURE 6, upon lowering the frame 34 to its lowermost position. However, immediately upon elevation of the frames 34, the arms 82 are released from the contact and deflection by the deflectors 85, and the trap arms 83 project into the tracks of the frames 34. In FIGURE 6 there are no wheels shown because the copyboard has been completely removed for illustration purposes.

To use the glass 12 in FIGURE 9, the clamp 75 is released by upward pressure of the operator's fingers to swing the forward edge free of the rim 42. Then the frames 34 may be pivoted about the wheels 59 and will function in the normal copyboard manner. The thickness of copy placed between the glass and the table surface sheet 45 will be accepted to the extent of the resilient nature of the pad 44 and its under supporting spring cushion 43.

ALTERNATIVE EMBODIMENT

The embodiment described has proven to be functionally reliable and satisfactory for its purpose. It does, however, limit the copyboard to a level upper position as shown in FIGURE 2. An alternative embodiment illustrated in the FIGURES 11 through 14 illustrates an approach which embodies considerable of the same principles, but provides for further possible table adjustments. The FIGURES 11 through 14 are schematic only, and reference is made to the specific teaching of structure of the glass reference plane and the details of the copyboard per se for inclusion in this portion by reference.

In FIGURE 11, the copyboard is shown in its lowermost position, as the FIGURE 2 drawing does in its full line illustration. Two large laterally positioned links 90 are carried by means of pivots 91 on supporting structure of the machine. An arcuate slot 92 in each link cooperating with pins 94 carried by side housing frames 25, enables the links 90 to swing between the limits shown in the FIGURES 11 and 12.

The first movement in operating the board is to cause the links 90 to move backwardly over the center of the pivots 91 to the FIGURE 12 position.

Second links, possibly better described as flanges 96, are pivoted to the top outer edges of the links 90 by means of pivots 98. Having reached to FIGURE 12 position, it is only necessary to apply sufficient force to the copyboard to elevate the board from the FIGURE 12 to the FIGURE 13 position. This may be done manually, or if necessary, it is within the skill of the mechanic to apply a power apparatus to drive the board to the FIGURE 13 position.

Figure 13:
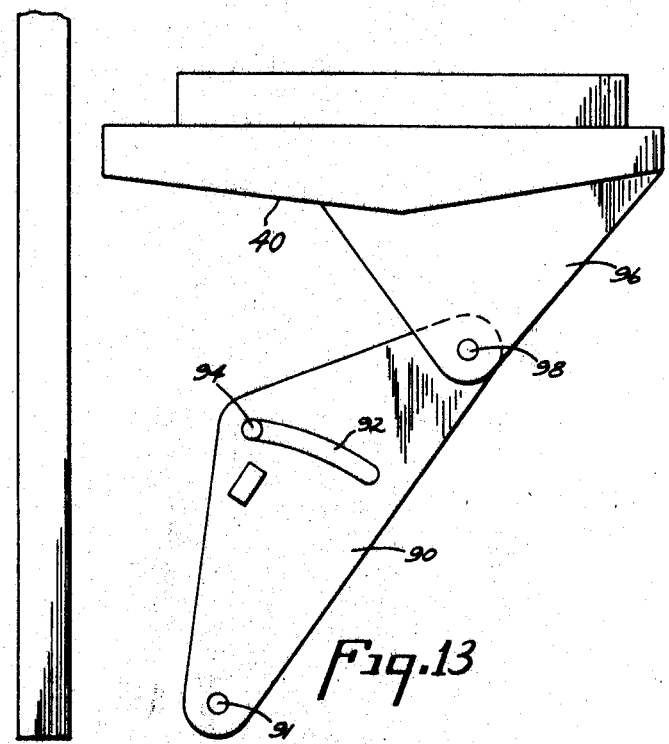
FIGURE 13 is the alternative embodiment elevated to a level table orientation.
Figure 14:
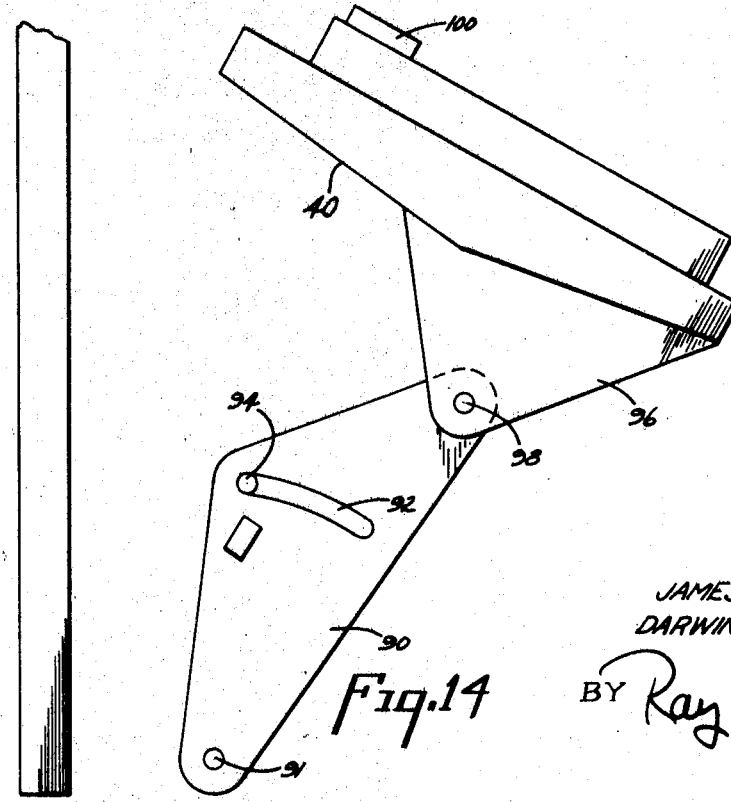
FIGURE 14 is the alternative embodiment further tilting into a drafting board position.

An advantage of this embodiment is in its ability to pivot beyond the level position of FIGURE 13 to the tilted position of FIGURE 14. A stop 100 is illustrated schematically to suggest that the stop member may be carried by the frame of the machine to limit the amount of further pivoting possible. Stop 100 may be adjustable. Nevertheless, the forward end where the operator works is caused to lower and the rear portion to angle upwardly, much in the manner of a draftsman's drawing board. Of necessity the guide devices which place limits upon the movement of the copyboard, spoken of with respect to the first embodiment, must be removed to assume the FIGURE 14 position. This FIGURE 14 position enables the operator to sit at the work and place material with ease, and normally may be accomplished with a conventional chair height. A draftsman's stool is not required.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

We claim:

1. In a process camera having a vertical object reference plane and a lens system focused upon a field of that plane, the improvement of structure to receive original objects in a table-top environment above said field and transport them to said plane in said field, comprising:
   a copyboard having a first side at operator position, an opposite second side adjacent said reference plane, and a work surface therebetween;
   a pivot mounting means carried by said copyboard, said pivot means having:
      a first and a second pivot trunnion in vertical relationship on each side of said copyboard and substantially centrally located between said first and second sides, providing a top first pivot and a lower second pivot;
   a pivot and lever drive system attached to said pivot mounting means providing a movement of said copyboard in a reversible path wherein one direction of movement is characterized by downward movement of the second side with said first side following thereafter to define a swing of said table wherein said work surface moves to coincide finally with said reference plane, said drive system including:
      (1) a pivotally mounted link on each side of said copyboard, each having one end secured to said first pivot and the other end supported to swing said first pivot through an arcuate path as said copyboard moves through a path between a table attitude and the vertical attitude of said reference plane;
      (2) a second link on each side of said copyboard, each having a first and second end with said first end secured to said copyboard second pivot, the second end having a curved configuration;
      (3) an abutment surface providing a fixed reference, a support pin a distance from said reference, and said second link having a longitudinal slot extending longitudinally of said link, said pin projecting through said slot, said link end configuration functioning as a cam follower against said pin and thereby providing a path of travel for said second pivot which is substantially vertical in the vicinity of said table-top environment of the copyboard for creating a rapid rotational movement of the copyboard to and from said table-top environment as the arcuate travel of the first pivot moves around the vertical path of the second pivot.

2. A copyboard construction for a process camera, comprising:
   a reference plane panel having a bottom edge, and a top edge;
   track and roller means for guiding said panel bottom edge in a vertical path, and means for releasably securing said top edge in a fixed position, said panel being swingable about said roller means in any elevational position;
   a copyboard having a first side at operator position, an opposite second side adjacent said reference plane, and a work surface therebetween;
   a track carried by said panel, and follower means carried by said second side of the copyboard, said follower means operable in conjunction with said track for guiding said copyboard second side in a path which is a function of said panel track, and drive means for swinging said copyboard between an upright position in abutment with said panel and a position extending from the panel top edge; and
   releasable engagement means for engaging said top edge of said panel to said copyboard and thereby causing the copyboard and panel to operate as a unit guided by said track and follower means of the panel, with said follower means remaining in fixed relationship to the track carried by the panel.

3. In a process camera having a vertical object reference plane and a lens system focused upon a field of that plane, the improvement of structure to receive original objects in a table-top environment above said field and transport them to said plane in said field, comprising:
   a copyboard having a first side at operator position, an opposite second side adjacent said reference plane, and a work surface therebetween;
   a first and a second pivot trunnion in vertical relationship on each side of said copyboard and substantially centrally located between said first and second sides, providing a top first pivot and a lower second pivot, and together comprising a pivot mounting means;
   a pivot and lever drive system attached to said pivot mounting means providing a movement of said copyboard in a reversible path wherein one direction of movement is characterized by downward movement of the second side with said first side following thereafter to define a swing of said table wherein said work surface moves to coincide finally with said reference plane, said pivot and lever drive system including:
      (1) a pivotally mounted link on each side of said copyboard, each having one end secured to said first pivot of said pivot mounting means, said one end having a curved path of travel about said link downwardly and toward said vertical plane in an upwardly opening arcuate path;
      (2) a second link on each side of said copyboard, each having a first and second end with said first end secured to said copyboard second pivot, said second pivot first end having a path of travel about said link downwardly and away from said vertical plane in an upwardly arcuate path;
      (3) a cam follower carried by said copyboard second side, said cam follower having a vertical free travel path over a portion of said table travel between said table-top environment and said final position of abutment with said vertical plane, and means to accept said cam follower and provide a positive guidance thereof for the remainder of said travel; and (4) means to provide positive holding and guidance of the second end of said second link only during the travel of said cam follower in said free travel path.

4. In a copyboard having a table at an attitude for acceptance and arrangement of material to be copied, and a vertical attitude below and forward for presentation of the material to a process camera lens system, the provision of a link and pivot system to provide transportation of said copyboard, comprising:

one link which is swingably mounted and carries the copyboard by a pivotal connection located between the ends of the copyboard, with means to swing the link through an arcuate path for driving the pivotal connection between the two maximum attitude positions; and a combination attitude control comprising a vertical stationary guide track and a cooperating track follower carried by one edge of the copyboard for guiding the copyboard between said vertical position attitude and an intermediate tilt position, and a second link connected by a pivot to said copyboard a distance from said pivotal connection of said one link and adapted to constrain said pivot thereof to induce said copyboard into a rotary drive motion between said intermediate and table attitude.

References Cited
UNITED STATES PATENTS

| | | | |
|---|---|---|---|
| 2,512,182 | 6/1950 | Sussin | 355—76 |
| 3,198,069 | 8/1965 | Florsheim et al. | 355—75 |

NORTON ANSHER, Primary Examiner

R. A. WINTERCORN, Assistant Examiner

U.S. Cl. X.R.

355—76